United States Patent [19]

Mitteregger et al.

[11] Patent Number: 4,708,632
[45] Date of Patent: Nov. 24, 1987

[54] INJECTION MOULDING MOULD

[75] Inventors: Erich Mitteregger; Ernst Schwaiger, both of Micheldorf, Austria

[73] Assignee: I.F.W.-Industrie-Formen und Werkzeugbau-Manfred Otte Gesellschaft m.b.H. & Co. KG., Micheldorf, Austria

[21] Appl. No.: 681,190

[22] Filed: Dec. 13, 1984

[30] Foreign Application Priority Data

Dec. 29, 1983 [AT] Austria ................................. 4560/83

[51] Int. Cl.⁴ ........................ B29C 45/40; B29C 45/44
[52] U.S. Cl. ...................................... 425/556; 249/63; 249/100; 249/152; 249/180; 249/185; 425/442; 425/537; 425/DIG. 58; 425/DIG. 218
[58] Field of Search ............... 425/236, 282, 286, 537, 425/554, 556, 577, 436 R, 436 RM, 438, 442, DIG. 218, 211, DIG. 58, DIG. 42, 441, 442, 444, 450.1, 467; 249/59, 63, 100, 152, 180, 185

[56] References Cited

U.S. PATENT DOCUMENTS

| 4,050,505 | 9/1977 | Kemper et al. | 425/211 |
| 4,292,269 | 9/1981 | Hock | 425/DIG. 42 |
| 4,353,522 | 10/1982 | Anger | 425/398 |
| 4,412,806 | 11/1983 | Gaiser et al. | 425/537 |
| 4,487,568 | 12/1984 | Wiatt et al. | 425/537 |

Primary Examiner—Jay H. Woo
Assistant Examiner—Timothy W. Heitbrink
Attorney, Agent, or Firm—Wenderoth, Lind & Ponack

[57] ABSTRACT

A mould which is used for the production by injection moulding of fittings which have an inner annular groove includes a divisible outer mould, a mould core and a mould ring. The mould core has a plurality of segments which can be folded together. In order to ensure with absolute reliability that the fitting does not remain clinging to the mould ring during removal of the fitting from the mould, the mould ring is connected to the mould core and is withdrawn together with the mould core from the fitting.

3 Claims, 3 Drawing Figures

INJECTION MOULDING MOULD

FIELD OF THE INVENTION

The invention relates to an injection moulding mould for producing pipe, a pipe socket or the like from thermo-plastic material, and which has at least one internal annular groove, the mould including a divisible outer mould member, a mould core which is formed is displaceable therein and on which a complementary mould projection for moulding the annular groove, and a mould ring, wherein the mould core and the mould ring are connected together and which, during the operation of removing the moulding from the mould, are withdrawn jointly from the end of the moulding.

DESCRIPTION OF THE PRIOR ART

An injection moulding mould of such type is described for example in Austrian patent specification No. 362 925. So that the moulded component can be satisfactorily removed from the mould when of a configuration having a socket end having an internal annular groove, particular attention must be directed to the temperature during the operation of removing the moulding from the mould. In addition, good results are achieved with such an injection moulding mould primarily when an annular groove having at least one conical side wall is moulded.

SUMMARY OF THE INVENTION

The object of the present invention is to improve an injection moulding mould of the type set forth above, whereby the operation of removing the moulding from the mould may be carried out over a wider temperature range, and whereby a pipe or socket end with an annular groove having a side wall extending normal to the wall of the pipe also can be satisfactorily removed from the mould.

Such object is achieved in that, in the region of the annular groove in the moulding, the mould core is formed by a plurality of segments which can be pivoted together.

In order to ensure that the mould core segments are pivoted together or collapsed inwardly in the region of the annular groove, a preferred embodiment provides that the segments are double-armed levers, the arm of which are disposed at approximately a right angle to each other, and that there is provided a locking ring which is connected by way of a tie rod or rods to a hydraulic piston cylinder unit and which bears alternately against the two arms of the segments.

A further embodiment of the invention provides that an O-ring is disposed at an abutment surface of the mould core with the segments when the segments are pivoted to an open position. Such arrangement ensures that the segments are safeguarded against damage, as well as avoiding excessive noise in the operation of removing the moulding from the mould.

BRIEF DESCRIPTION OF THE DRAWINGS

An embodiment of the invention is described in greater detail hereinafter with reference to the accompanying drawings, without such embodiment being considered in a restrictive fashion, and wherein.

DETAILED DESCRIPTION OF THE INVENTION

Figure 1:
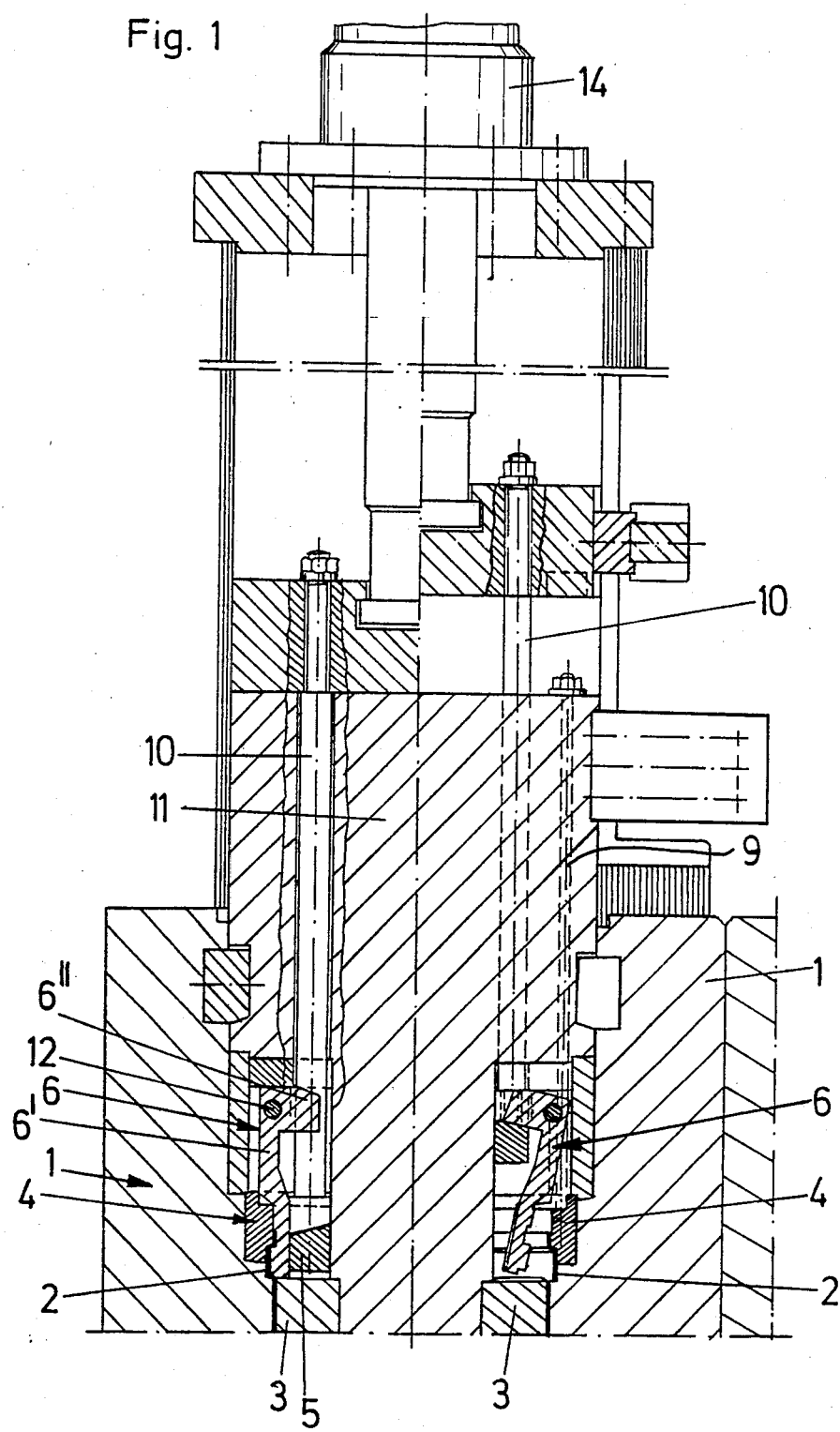
FIG. 1 is a diagrammatic view in section through an injection moulding mould according to the invention.
Figure 2:
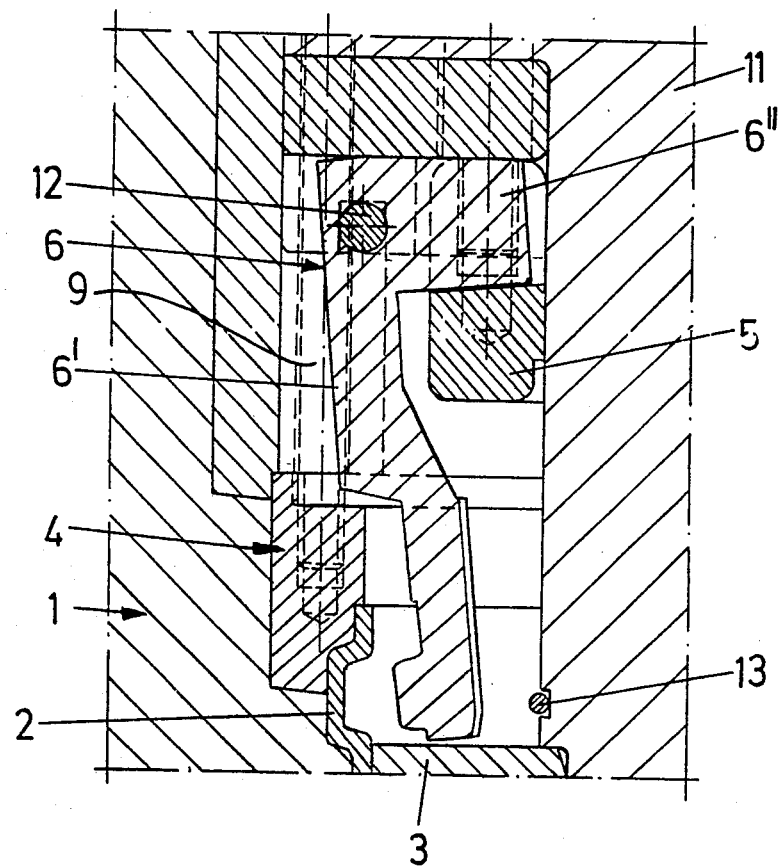
FIGS. 2 and 3 each are sectional views, on an enlarged scale, through the injection moulding mould in the region of segments thereof, FIG. 2 showing the segments in a position for removal of the moulding, and FIG. 3 showing the segments in an injection position.

A mould cavity and thus a form of the moulding 2 are defined by a divisible outer mould 1, a mould core 3 with segments 6 and a mould ring 4.

Figure 3:
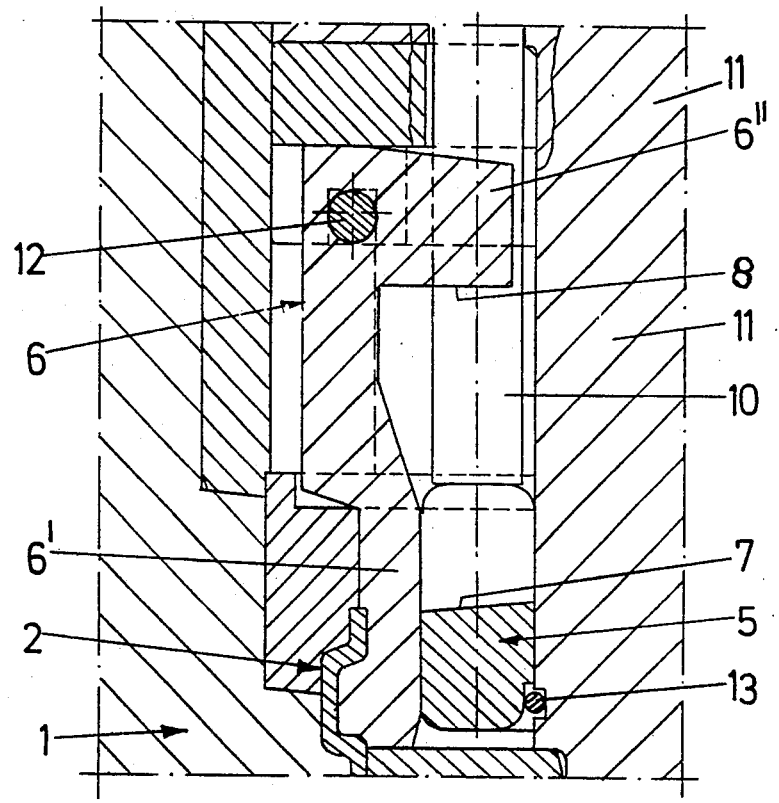

During a injection moulding operation, the components of the injection moulding mould are in the position shown at the left in FIG. 1 and in FIG. 3.

When the injection operation is concluded, after the raw material has cooled down and set, the outer mould 1 is opened. A hydraulic piston cylinder unit 14 pulls a locking ring 5 back by way of a tie rod 10 or a plurality of tie rods 10. The locking ring 5 presses by means of an abutment surface 7 thereof against a corresponding opening abutment surface 8 of the segments 6.

As will be seen from the drawings, the segments 6 are in the form of double-armed levers, the arms 6' and 6" thereof extending approximately at a right angle to each other.

The locking ring 5 causes the segments 6 to be turned about their axes 12 and causes the arms 6' thereof to be urged inwardly.

In order to prevent damage being done to the segments 6 and to avoid excessive noise in the operation of removing the moulding from the mould, the arrangement has an O-ring 13 which damps the impact of the segments 6.

The complete mould core 3 is subsequently withdrawn from the moulding 2 by the hydraulic piston cylinder unit 14.

As the mould ring 4 together with the segments 6 is fixedly connected to the core sleeve portion 11 by way of rods 9, the mould ring 4 is withdrawn from the moulding 2, together with the mould core 3.

After ejection of the moulding 2, the hydraulic piston cylinder unit 14 urges the complete mould core 3 with the segments 6 and the mould ring 4 back into the injection position.

By moving the locking ring 5 forward, the segments 6 are moved into their spread-apart position (see FIG. 3), and the locking ring 5 holds the segments 6 inflexibly during the injection operation.

What is claimed is:

1. A mould for performing an injection moulding operation to produce from a thermoplastic material an annular object having an internal annular groove, said mould comprising:

a divisible outer mould;

a mould core displaceably mounted within said outer mould;

a mould ring connected to said mould core and displaceable therewith, said mould ring having an inner moulding surface for forming a portion of the object exterior;

means, connected to said mould core, for defining a moulding surface for forming the internal annular groove of the object, said means comprising a plurality of segments pivotally mounted on said mould core for movement between a moulding position, whereat said segments cooperate to define said groove forming moulding surface, and an ejection position, wherein said segments are withdrawn inwardly from said moulding position, said segments comprising double-arm levers, each said lever having first and second arms extending approximately at a right angle to each other;

a locking ring mounted for movement between a first position for contacting said first arms of said levers to move said segments to said moulding position and a second position contacting said second arms of said levers to move said segments to said ejection position; and means for, upon opening of said divisible outer mould and movement of said segments to said ejection position, withdrawing from said divisible outer mould said mould core, said mould ring and said segments, said withdrawing means comprising a hydraulic piston cylinder unit which also is operable by means of at least one rod connected to said locking ring to move said locking ring between said first and second positions thereof.

2. A mould as claimed in claim 1, further comprising means for cushioning said segments upon movement thereof to said ejection position.

3. A mould as claimed in claim 2, wherein said cushioning means comprises an O-ring mounted on said mould core at a position to be abutted by said segments.

* * * * *